(12) United States Patent
Christel et al.

(10) Patent No.: US 11,839,996 B2
(45) Date of Patent: Dec. 12, 2023

(54) METHOD AND DEVICE FOR PROCESSING A MIXTURE OF RECYCLED POLYESTER MATERIAL AND A POLYESTER PREPOLYMER FROM A POLYESTER MANUFACTURING PROCESS

(71) Applicant: POLYMETRIX AG, Oberbüren (CH)

(72) Inventors: Andreas Christel, Zuzwil (CH); Karl Schöpf, Obstalden (AT)

(73) Assignee: Polymetrix AG, Oberbüren (CH)

( * ) Notice: Subject to any disclaimer, the term of this patent is extended or adjusted under 35 U.S.C. 154(b) by 366 days.

(21) Appl. No.: 17/168,223

(22) Filed: Feb. 5, 2021

(65) Prior Publication Data
US 2021/0245399 A1 Aug. 12, 2021

(30) Foreign Application Priority Data
Feb. 12, 2020 (EP) .................................. 20157008

(51) Int. Cl.
*B01J 8/18* (2006.01)
*B01D 53/86* (2006.01)
(Continued)

(52) U.S. Cl.
CPC ............... *B29B 9/10* (2013.01); *B01D 53/02* (2013.01); *B01D 53/8696* (2013.01);
(Continued)

(58) Field of Classification Search
CPC .. B29B 9/10; B29B 7/845; B29B 7/86; B29B 7/38; B29B 7/885; B29B 7/90; B29B 9/12; B29B 9/16; B29B 9/06; B29B 9/065; B29B 17/00; B29B 7/66; B29B 2009/168; B01D 53/02; B01D 53/8696; B01J 8/1809; B01J 8/1818; B01J 8/1836; B01J 2208/00132; B01J 2208/00176; B01J 2208/00504;
(Continued)

(56) References Cited

U.S. PATENT DOCUMENTS

| 5,876,644 | A | * | 3/1999 | Nichols | ................ | B29B 7/007 |
| | | | | | | 264/141 |
| 6,548,031 | B1 | * | 4/2003 | Ferreira | ................ | B01D 53/30 |
| | | | | | | 422/111 |
| 2012/0035342 | A1 | | 2/2012 | Culbert et al. | | |

FOREIGN PATENT DOCUMENTS

| CH | 698 275 A2 | 6/2009 |
| CN | 204485642 U | * 7/2015 |

(Continued)

OTHER PUBLICATIONS

Machine translation of CN-204485642 U (Year: 2023).*

*Primary Examiner* — Huy Tram Nguyen
(74) *Attorney, Agent, or Firm* — Finch & Maloney PLLC (57) ABSTRACT

A method for processing a mixture of recycled polyester material and a polyester prepolymer from a polyester manufacturing process, wherein a recycled polyester material is mixed with a polyester prepolymer, from a polyester manufacturing process, and treated in a bulk thermal treatment reactor (7) with a process gas which flows in a counter-current or a cross-current flow direction to the flow direction of the mixture. In this process, the process gas, before entering a catalyst vessel (14), is passed through a protective bed (11) containing a solid adsorbent material that removes high-boiling organic substances or organic substances, with a high combustion temperature, from the process gas stream.

8 Claims, 2 Drawing Sheets

(51) Int. Cl.
    *B01D 53/02*         (2006.01)
    *B29B 9/10*          (2006.01)
    *B29K 67/00*        (2006.01)
    *B29K 105/00*      (2006.01)
    *B29K 105/26*      (2006.01)

(52) U.S. Cl.
    CPC ........... *B01J 8/1809* (2013.01); *B01J 8/1818* (2013.01); *B01J 8/1836* (2013.01); *B01J 2208/00132* (2013.01); *B29K 2067/00* (2013.01); *B29K 2105/253* (2013.01); *B29K 2105/26* (2013.01)

(58) Field of Classification Search
    CPC .............. B01J 2208/0053; B01J 6/004; B29K 2067/00; B29K 2105/253; B29K 2105/26; C08G 63/785; C08J 11/12; C08J 2367/02; C08J 2367/04
    USPC ...................................................... 264/37.17
    See application file for complete search history.

(56) References Cited

FOREIGN PATENT DOCUMENTS

| | | |
|---|---|---|
| DE | 10 2004 006 861 A1 | 9/2005 |
| EP | 0 699 471 A1 | 3/1996 |
| EP | 0 722 766 A1 | 7/1996 |
| EP | 1 100 611 B1 | 5/2001 |
| EP | 2 398 598 B1 | 3/2017 |
| WO | 00/77071 A1 | 12/2000 |

\* cited by examiner

METHOD AND DEVICE FOR PROCESSING A MIXTURE OF RECYCLED POLYESTER MATERIAL AND A POLYESTER PREPOLYMER FROM A POLYESTER MANUFACTURING PROCESS

This application claims priority from European patent application serial no. 20157008.2 filed Feb. 12, 2020.

FIELD OF THE INVENTION

Processes for purifying process gases from a thermal treatment process of bulk materials by catalytic combustion are known. One particular embodiment provides for the purification of process gases which are essentially recirculated and may contain only small amounts of residual oxygen after catalytic combustion. This is particularly necessary if the bulk material to be treated is sensitive to oxygen. The combustion of organic substances reduces the oxygen content in the process gas. Accordingly, the process gas must contain a sufficient amount of oxygen to ensure combustion, but at the same time be kept low enough in the process gas so that no excessive amount of oxygen remains in the process gas after combustion. For this purpose, a controlled amount of oxygen is added to the process gas, the control being based on a measurement of a gas component.

BACKGROUND OF THE INVENTION

Usually, the gas composition at the inlet or outlet of the catalyst bed is measured and the oxygen supply for the combustion process is controlled accordingly.

Such combustion devices consist of a series of process devices necessary to ensure the combustion process. Essentially, devices to heat the process gas, devices to provide a catalyst bed and devices to cool the process gas are used. The individual devices are connected to each other by means of process gas lines.

For the measurement and control of the oxygen quantity, measuring gas lines, measuring chambers, gas sensors, feed lines for oxygen-containing gases and control valves for the oxygen-containing gases are also used. In addition, sample gas lines and measuring chambers are required for calibrating the gas sensors.

All in all, this results in an expensive and complex device, which causes considerable costs and time during installation. Furthermore, the large number of components and the pipelines connecting these components cause a high energy loss through heat radiation. In order to minimize heat losses, appropriate insulation material must be applied, which in turn is associated with high material and installation costs.

The operation of such devices must always be designed for the organic substance in the gas mixture that is most difficult to burn. The entry temperatures into the catalyst bed must be selected so high that the organic substance in the gas mixture that is most difficult to burn is almost completely combusted. In particular, if high-boiling organic substances or substances with a high combustion temperature are present in the gas mixture, a correspondingly high entry temperature into the catalyst bed must be achieved, which requires large heat exchangers for heating the process gas and in turn necessitates high energy consumption and/or further process stages for energy recovery.

If the required temperature for complete combustion is not reached, this leads to contamination and thus deactivation of the catalyst material. As a result of deactivation, the entry temperature into the catalyst bed must be increased further, which entails further energy and equipment disadvantages. If deactivation is so advanced that sufficient combustion is no longer guaranteed, the catalyst material must be replaced, which involves high material and labor costs as well as interruption of operation.

According to EP-0 722 766 A1, the oxygen concentration at the outlet of the catalyst is measured with a fast-response sensor. According to EP-0 699 471 A1, the carbon monoxide content is measured at the outlet of the catalyst. According to EP-1 100 611 A1, the ratio of combustible substances to oxygen is measured at the inlet and outlet of the catalyst bed.

According to the previously mentioned prior art, catalysts containing noble metals are used as catalysts.

According to DE-10 2004 006 861 A1, metal oxides can also be used as catalyst material.

According to CH-698 275 A2, the gas component is measured in a separate measurement chamber, and the advantages of slow-response sensors are also described.

Overall, the devices described above are complex and expensive to manufacture, install and operate. While there are efforts to save operating costs through reduced combustion temperatures, no mention is made of the fact that this reduces the lifetime of the catalytically active materials. Only the use of process stages to separate solids and the adsorption of catalyst poisons are mentioned as protective measures to extend the service life.

For ecological reasons, the recycling of polyesters such as PET has become increasingly important. One variant envisages mixing recycled polyester material with polyester prepolymer pellets from a polyester manufacturing process to obtain high quality product. Preferably, a recycled polyester is introduced into a polyester manufacturing process for this purpose.

WO00/77071 A1 describes two ways in which a recycled polyester can be introduced into a polyester manufacturing process.

In the first option, pre-purified recycled polyester material is extruded and pelletized to obtain recycled polyester pellets, which are subsequently mixed with polyester prepolymer pellets from a polyester manufacturing process, and together are subjected to solid phase polycondensation treatment.

In the second option, pre-purified recycled polyester material is extruded to obtain a recycled polyester melt, which is subsequently mixed with a polyester prepolymer melt from a polyester manufacturing process, pelletized together and subjected to solid state polycondensation treatment.

In both cases, the purification of the recycled polyester is carried out in one or more of the following steps:
- Removal of surface impurities in the solid phase, for example by means of a washing process;
- Removal of impurities by thermal treatment in the solid phase, for example by a drying process;
- Removal of impurities in the melt phase, for example by applying a vacuum or by means of a purge gas in a degassing chamber;
- Removal of impurities by thermal treatment in the solid phase in a solid phase polycondensation step.

The removal of surface impurities reduces the content of volatile, semi-volatile and non-volatile impurities. However, this is limited to impurities present on the surface or mixed with the recycled polyester. Impurities within the polyester, for example absorbed impurities or additives, are not affected.

In the thermal treatment prior to extrusion, a large proportion of volatile impurities can be removed. Nevertheless, with the usually limited process conditions, only little of the semi-volatile impurities are removed. The removal of semi-volatile impurities in this step could be increased by longer residence times and higher process temperatures. However, this would have adverse consequences for the subsequent process steps and the quality of the recycled polyester (discoloration, formation of decomposition products, undesired increase in viscosity).

During extrusion, residual surface impurities, absorbed impurities and impurities present as separate particles are homogeneously mixed with the recycled polyester melt. At the same time, regenerated impurities are formed. These regenerated impurities include degradation products of impurities as well as degradation products of the recycled polyester, wherein the degradation of the polyester is often accelerated (catalyzed) by impurities present.

WO 00/77071 A1 describes the possibility of using a degassing chamber. However, extensive use of such devices to remove larger amounts of semi-volatile impurities would have strongly detrimental consequences for the quality of the recycled polyester (discoloration, formation of decomposition products). Apart from that, the problem of formation of decomposition products would not be solved.

From the previously listed correlations, it is clear that the solid phase polycondensation step at the end plays an important role in the removal of volatile and semi-volatile impurities. This is also evident from Tables 1, 3 and 4 of WO 00/77071 A1, where solid phase polycondensation purification rates of >27 for toluene, 21 for benzophenone and 264 for chloroform are indicated.

Thus, it is also clear that impurities from recycled polyester are introduced into the solid phase polycondensation step at the end of the process chain. Nevertheless, WO00/77071 A1 only refers to standard technology for carrying out solid phase polycondensation. However, processing a mixture of newly produced polyester (so-called "virgin" material) with recycled polyester cannot be continuously processed over a required longer operating time in a conventional solid-phase polycondensation plant, due to the significantly higher load of impurities.

It has been the problem of the present invention to overcome the disadvantages of the prior art discussed herein and to provide an improved method and device for processing a mixture of recycled polyester material and polyester prepolymer from a polyester manufacturing process.

SUMMARY OF THE INVENTION

According to the present invention, the present problem is solved by a method according to the independent claim(s).

More specifically, the present invention relates to a method for processing a mixture of recycled polyester material and a polyester prepolymer from a polyester manufacturing process, comprising the following steps:

Blending of a recycled polyester material with a polyester prepolymer from a polyester manufacturing process to produce a mixture of solids;

Treatment of this mixture of solids in a reactor for thermal treatment of bulk materials with a process gas in countercurrent or crosscurrent to the flow direction of the mixture;

introducing the process gas containing organic impurities and optionally an amount of oxygen less than required to completely combust the organic impurities in said process into at least one heat exchanger to heat the process gas, and heating the process gas in said heat exchanger, Controlled supply of an oxygen-containing gas to the process gas, Introduction of the process gas mixed with the oxygen-containing gas into a catalyst vessel with at least one catalyst bed arranged therein, through which the process gas flows from an inlet side to an outlet side, Combustion of the organic impurities in the process gas in the at least one catalyst bed, At least partial recirculation of the process gas, preferably into the reactor for thermal treatment of bulk materials, characterized in that, before entering the catalyst vessel, the process gas is passed through a protective bed arranged upstream of the heat exchanger for heating the process gas and containing a solid adsorption material which removes high-boiling organic substances or organic substances having a high combustion temperature from the process gas stream, a temperature in the range of 100 to 250° C. being set so that the high-boiling substances can condense and be taken up by the adsorption material.

This process is characterized in particular by the fact that substances introduced into the process by the recycled polyester material, which are taken up by the process gas during solid phase condensation, can be reliably removed from the process gas. This enables reliable and continuous processing of a mixture of recycled polyester material and a polyester prepolymer from a polyester manufacturing process. In particular, according to the invention, the substances requiring the highest combustion temperatures can be removed from the process gas by adsorption prior to combustion. This has the advantage that lower combustion temperatures can be used, which means that smaller devices can be used for heating and cooling, and that the required energy consumption can be reduced.

The process according to the invention is used for the purification of process gases from a thermal treatment of bulk materials, wherein the purification is carried out by catalytic combustion.

Bulk solids are any form of free-flowing solid particles, such as grains, flakes, pellets, powders, or agglomerates.

According to the invention, the bulk materials are polycondensates, namely polyesters.

Polymers are obtained from their monomers by a polymerization reaction, such as free radical, anionic or cationic polymerization, polyaddition or polycondensation. Polymers of one polymer type can be obtained from the same main monomers. Polymers of one polymer type can also be obtained from several main monomers. The individual monomers can be arranged alternately, randomly or in blocks. A limited number of other monomers, so-called comonomers, can also be used.

Monomers can be obtained from fossil fuels, such as crude oil, natural gas or coal, or from renewable raw materials. Monomers can also be obtained by depolymerization or pyrolysis from existing polymers, especially recycled polymers.

Particularly suitable polymers are polyesters including polyhydroxyalkanoates, polylactides or their copolymers.

Polycondensates are obtained by a polycondensation reaction with cleavage of a low molecular weight reaction product. The polycondensation can take place directly between the monomers. The polycondensation can also take place via an intermediate stage, which is subsequently reacted by transesterification, wherein the transesterification can again take place with cleavage of a low-molecular reaction product or by ring-opening polymerization. Essentially, the polycondensate obtained in this way is linear, although a small number of branches may be formed.

Polyesters are polymers usually obtained by polycondensation from a diol component having the general structure HO—$R^1$—OH and a dicarboxylic acid component having the general structure HOOC—$R^2$—COOH, where $R^1$ and $R^2$ are usually aliphatic hydrocarbons having 1 to 15 carbon atoms, aromatic hydrocarbons having 1 to 3 aromatic rings, cyclic hydrocarbons having 4 to 10 carbon atoms, or heterocyclic hydrocarbons having 1 to 3 oxygen atoms and 3 to 10 carbon atoms.

Typically, linear or cyclic diol components and aromatic or heterocyclic dicarboxylic acid components are used. Instead of the dicarboxylic acid, its corresponding diester, usually dimethyl ester, can also be used.

Typical examples of polyesters are polyethylene terephthalate (PET), polybutylene terephthalate (PBT), polytrimethylene terephthalate (PTT), polyethylene furanoate (PEF), polytrimethylene furanoate (PTF), polybutylene succinate (PBS) and polyethylene naphthalate (PEN), which are used either as homopolymers or as copolymers.

Polyesters are also polymers with repeating ester groups having the general structure H—[O—R—CO]$_x$—OH, where R is usually an aliphatic hydrocarbon with 1 to 15 carbon atoms, an aromatic hydrocarbon with 1 to 3 aromatic rings, a cyclic hydrocarbon with 4 to 10 carbon atoms, or a heterocyclic hydrocarbon with 1 to 3 oxygen or nitrogen atoms and 3 to 10 carbon atoms.

An example is polyhydroxyalkanoates with the general structure H—[O—C(R)H—(CH$_2$)$_n$—CO]$_x$—OH, where R is usually a hydrogen or an aliphatic hydrocarbon with 1 to 15 carbon atoms and n is 1 to 10. Examples include poly-4-hydroxybutyrate and poly-3-hydroxyvalerate.

Another example are polylactides with the general structure H—[O—C(R)H—CO]$_x$—OH, where R is usually a methyl group or an aliphatic hydrocarbon with 1 to 15 carbon atoms.

Another example is polyglycolic acid with the general structure H—[O—CH$_2$—CO]$_x$—OH.

Polyesters are also polymers prepared by ring-opening polymerization from heterocyclic monomers having one ester group, such as polycaprolactone from caprolactone, or by ring-opening polymerization from heterocyclic monomers having at least two ester groups, such as polylactide from lactide.

The most common polylactide is polylactic acid with the structure H—[O—C(CH$_3$)H—CO]$_x$—OH. Due to the chirality of lactic acid, various forms of polylactic acid exist. Homopolymers are poly-L-lactide (PLLA), usually prepared from L,L-lactide, and poly-D-lactide (PDLA), usually prepared from D,D-lactide. Copolymers such as poly-(L-lactide-co-D,L-lactide) contain small amounts of lactide units with chirality different from the main monomer.

Polyesters can also be produced by biosynthesis using microorganisms or in plant cells, from which they are obtained by cell disruption.

The suitable polymers may be homopolymers. Despite the designation homopolymer, a small proportion of comonomers can be formed in the manufacturing process. For example, in the production of polyethylene terephthalate, diethylene glycol is known to form from ethylene glycol. However, many suitable polymers are copolymers that contain some amount of comonomer. The comonomers may be introduced as part of the monomers in the polymer manufacturing process, or they may form as part of the manufacturing process, usually resulting in a random distribution in the final polymer. The comonomers can also be inserted as blocks, made from different monomers, resulting in so-called block copolymers.

Suitable polymers can be polymer blends, which can contain any number and amount of different types of polymers. A small amount of one polymer can act as a nucleating agent in other polymers, thereby increasing its crystallization rate.

Specific polymer mixtures can form mutually interacting crystal structures with crystallization behavior that differs from the individual components. An example of this is a mixture of PDLA and PLLA, which forms a stereocomplex crystal structure with increased crystallinity.

After polymerization, each polymer chain has chain-terminating groups with typically the functionality of at least one of its monomers. As an example, a polyester chain may have one or more hydroxyl and/or carboxyl end groups. A polyamide chain may have one or more hydroxyl and/or amine end groups. Such end groups may be modified by a so-called end-capping reagent or by a degradation reaction. Although not specifically mentioned in the above general structures, suitable polymers may have such modified end groups.

Additives can be added to the polymer. Suitable additives include, for example, catalysts, dyes and pigments, UV blockers, processing aids, stabilizers, impact modifiers, blowing agents of chemical and physical nature, fillers, nucleating agents, flame retardants, plasticizers, barrier or mechanical property improving particles, reinforcing bodies, such as beads or fibers, and reactive substances, such as oxygen absorbers, acetaldehyde absorbers or molecular weight increasing substances.

The polymer can be a virgin material or a recyclate. Recyclates are polymers recycled from manufacturing and processing operations (post industrial) or polymers collected and recycled after consumer use (post consumer). The present invention is directed to the processing of a blend of recycled polyester material and a polyester prepolymer from a polyester manufacturing process.

Polyester manufacturing processes are sufficiently known in the prior art (e.g. Scheirs/Long (eds.), Modern Polyesters, Wiley 2003). For the present invention, continuous polyester manufacturing processes are preferred. According to the present invention, suitable polyester manufacturing processes are such that a polyester prepolymer melt is prepared by melt phase polymerization, this prepolymer melt is formed into polyester prepolymer pellets by means of pelletizers, and the polyester prepolymer pellets are processed into polyester pellets by solid phase polycondensation. Here, the melt phase polymerization comprises a process step in which the suitable viscosity for further processing is achieved. This can be done, for example, in a melt phase reactor. Once the suitable viscosity is reached, the polyester melt is fed through suitable melt lines to one or more pelletizers. Optionally, the melt can be filtered in a melt filter. The term melt filter includes screen changers and static filters or filter cartridges.

Recycled polyesters can consist of industrial waste, for example from polyester manufacturing processes, or from reprocessing processes of polyesters. Recycled polyesters can preferably consist of consumer waste, for example used polyester articles. Typical examples of such articles are polyester bottles, polyester trays or polyester fibers. Depending on their size and nature, the polyester articles have to be ground and/or compacted to obtain suitable particle sizes and bulk densities for further processing. Suitable bulk densities are between 100 and 800 kg/m$^3$, in particular between 200 and 500 kg/m³. Suitable particle sizes are between 1 and 50 mm, in particular between 2 and 25 mm. Recycled polyesters must be cleaned before further processing, depending on their degree of contamination. This can include process steps such as washing, sorting or separation. Furthermore, recycled polyesters can be separated from volatile impurities and water by means of thermal treatment in a gas stream and/or at reduced pressure.

A melt of recycled polyesters is usually produced by extrusion. Alternatively, simple melting reactors can also be used. The recycled polyester melt can optionally be subjected to further pressure build-up by means of a melt pump, separation of solids by means of melt filtration and/or separation of volatile impurities by means of entrained gas or vacuum. Preferably, the recycled polyester melt is filtered through a screen of comparable or smaller fineness, such as a screen for the filtration of the melt in the polyester production process.

The recycled melt can be pelletized to obtain recycled polyester pellets. Conventional pelletizers such as underwater pelletizers (UWG) or underwater strand pelletizers (USG) can be used.

These recycled polyester pellets can be mixed with pellets of a polyester prepolymer from a polyester manufacturing process in a unit for preparing the mixture of recycled polyester material and a polyester prepolymer from a polyester manufacturing process. Units for mixing pellets are known. Examples include stirred or passive mixing silos, stirred mixers or screw mixers.

On the other hand, the recycled melt can be fed through a melt line to a connecting unit with a melt of polyester prepolymer from a polyester manufacturing process, as a unit for producing the mixture of recycled polyester material and a polyester prepolymer from a polyester manufacturing process. This can be, for example, a corresponding pipe connector piece. The melt mixture is then pelletized in a common melt line in a pelletizer (for example an underwater pelletizer (UWG) or an underwater strand pelletizer (USG)).

According to the invention, a mixture of solids means a mixture of pellets of different composition (virgin PET or rPET) as well as pellets produced by mixing a recycled melt and a melt of polyester prepolymer from a polyester manufacturing process and subsequent pelletization of this mixed melt.

The connecting unit is located between the process step in which the suitable viscosity of the melt for further processing is achieved (e.g. in a melt polycondensation unit or an extruder) and at least one of the pelletizers. The connecting unit may be upstream or downstream of optional filtration in the polyester manufacturing process. After the connecting unit, a static mixer may optionally be used. However, if the connecting unit is upstream of the optional filtration, the static mixer can optionally be omitted.

Another source of contamination may arise in the piping to this interconnect unit, in which a recycled polyester melt is mixed with a polyester prepolymer melt from a polyester manufacturing process. Also, in the preparation of the polyester prepolymer melt and the recycled melt, WO00/77071 A1 merely refers to generally known technology. In the prior art, it is common for polyester production plants to be operated continuously in many cases and to operate continuously for years. This cannot be expected from extrusion processes, which usually experience several process interruptions per year.

During such interruptions, recycled polyester dwells in the melt lines at high temperatures for extended periods of time. Even if such lines are cooled, degraded polyester is still produced, which is mixed with the polyester prepolymer melt when the extrusion process is restarted, resulting in large quantities of unusable product.

According to the invention, preferably a melt valve is arranged in the connection unit or immediately upstream of the connection unit, which allows the feed line (melt line) for recycled polyester melt to be shut off. This has the advantage that in the event of an interruption in operation, in which recycled polyester remains in the melt lines at high temperatures for a long time and degrades even when these lines are cooled, such degraded recycled polyester is not mixed with the polyester prepolymer melt when the extrusion process is restarted. Rather, such degraded recycled polyester can be removed from the line. In this way, the formation of large amounts of unusable product is avoided.

According to a preferred embodiment of the present invention, there is at least one flush valve in the melt line upstream of the connection unit. The flush valve can be used to lead melt of recycled polyester, which does not meet the desired specifications, out of the plant.

This can be start-up material, which in particular has too low a viscosity and too strong a yellowing, or a material that is outside the desired specifications for critical quality parameters (such as viscosity or color) due to impurities.

The flush valve can be integrated directly into the melt valve on the connecting unit. In addition to the flush valve, a start-up valve can be arranged downstream of the extrusion unit to guide start-up material out of the extrusion process.

Another disadvantage of the process according to WO 00/77071 A1 results from the frequently varying quality of recycled input material. Excessive amounts of impurities, some of which are present in clusters, can often not be detected by analytical measures. Quality defects are usually only apparent after pelletization or, in some cases, only in the end product. This can result in large quantities of low-quality production batches, where not only the recycled polyester but also the polyester prepolymer from the manufacturing process becomes unusable.

According to a further preferred embodiment of the invention, therefore, a measurement of a quality parameter takes place in the melt line for recycled polyester melt.

The measured quality parameter can be used to ensure that the recycled polyester melt is automatically discharged from the plant when a critical value is reached.

The measured quality parameter can alternatively be used to make adjustments in the polyester manufacturing process on the basis of the measured parameter or to make automatic adjustments to process parameters by means of a control device. In particular, the measurement of a color value and the adjustment or control of a colorant addition in the polyester manufacturing process is preferred.

Alternatively, the measuring point can also be located after the connection unit.

Color and viscosity in particular are considered quality parameters. Both can be measured in-line or on-line. In-line measurement of viscosity is carried out, for example, by means of measuring instruments that measure the torsional force of a measuring probe in the melt. An in-line measurement of viscosity is also carried out, for example, by measuring the pressure drop in a defined measuring gap through which the melt flows, with the measured melt remaining in the process or being returned to it. An on-line measurement of viscosity is performed, for example, by measuring the pressure drop in a defined measuring gap through which a portion of the melt flows, with the measured melt being removed from the process. In all cases, a viscosity is calculated via the measurement of a mechanical variable on the basis of comparative measurements.

An in-line measurement of color, for example, is made by means of a light source on one side of the melt line and a light-sensitive sensor on the other side of the melt line, wherein a color value can be calculated via the amount of light absorbed at different wavelengths.

An on-line measurement of the color is carried out, for example, by means of a light source on one side of a test strip prepared from the melt and a light-sensitive sensor on the other side, wherein a color value can be calculated via the amount of light absorbed at different wavelengths. The light source and sensor can be connected to the actual measuring point via optical fibers.

According to a preferred embodiment of the present invention, the solid phase polycondensation step is dimensioned such that both the substantially full capacity of the polyester prepolymer manufacturing process and the substantially full amount of the installed capacity of recyclate can be processed. In particular, in the event of a subsequent retrofitting of a polyester manufacturing plant, the total plant capacity can be increased after installation of a recyclate feed device by upgrading the solid phase polycondensation device.

The blend of recycled polyester and polyester prepolymer from a polyester manufacturing process can comprise any blend ratio. Preferably, according to the invention, the ratio of recycled polymer to prepolymer is in the range of 5% to 95% to 75% to 25%.

A limiting factor here is that a plant for the production of polyester prepolymer is designed with a certain size and cannot be arbitrarily reduced in its output. A preferred embodiment of the present invention therefore provides for a blend of recycled polyester and polyester prepolymer from a polyester manufacturing process with a maximum content of 50% recyclate. The minimum recyclate content of the blend results from the economy of the additional process step of blending, which usually requires a recyclate content of at least 10%, in particular at least 15%.

According to the invention, process gases with a low oxygen content, such as nitrogen, carbon dioxide, noble gases, water vapor or mixtures of these gases, are used for thermal treatment of the bulk materials. Such process gases are usually referred to as inert gases. Inert gases are used in particular when the bulk materials are oxygen-sensitive bulk materials.

Bulk materials are referred to as oxygen-sensitive bulk goods if the bulk materials change more during thermal treatment due to the effect of oxygen than would be the case during thermal treatment without oxygen. Such changes can lead, for example, to discoloration, formation of cleavage products and/or reduction of the molecular weight of the bulk material.

Despite the designation as inert gas, the process gas may contain small amounts of oxygen, wherein this oxygen may have entered the process gas through leakage, for example, or may have remained in the process gas due to incomplete combustion.

A thermal treatment process of bulk materials is defined as any process in which bulk materials are treated under the action of a process gas for a specific residence time at a specific temperature. Residence time and temperature can be varied over a very wide range, with residence times ranging from a few minutes to several hundred hours and temperatures between the boiling temperature of the process gas and the melting or decomposition temperature of the bulk material being conceivable.

Thermal treatment is usually carried out in a treatment chamber that can accommodate the bulk material and the process gas. The corresponding treatment space is usually formed by reactors. Suitable reactors can be of conical or cylindrical construction, with a round or angular cross-section. Suitable reactors have at least one inlet opening and one discharge opening for the bulk material, and at least one inlet opening and one discharge opening for the process gas. The reactors can have various internals for influencing the product flow and/or gas flow.

The effect of the process gas is such that organic substances from the polymer are absorbed by the process gas and discharged from the treatment chamber.

Preferably, the thermal treatment is carried out continuously or semi-continuously, with both the process gas and the bulk material being fed to the reactor either continuously or in individual batches smaller than the reactor volume. The process gas is thereby fed either in cross-current flow or counter-current flow to the flow direction of the bulk materials. A preferred embodiment provides for continuous thermal treatment in a moving bed reactor in counter-current flow.

Alternatively, a discontinuous mode of operation is also conceivable, in which a given bulk material quantity in a reactor is flowed through by process gas.

The size of the reactors is determined by the requirements of the thermal treatment (residence time and throughput). Examples of corresponding reactors are known from EP-2 398 598 A1.

The organic substances taken up by the process gas include any organic substances that are released from the bulk material during the thermal treatment of a bulk material and are present in gaseous form or dissolved in the process gas. If the bulk material is a polymer, the organic substances mainly comprise residues from the polymerization process, decomposition products from the polymer and the additives contained in the polymer, as well as impurities that were introduced into the treatment process together with the polymers, and their decomposition products. Usually, the organic substances are hydrocarbons, and foreign atoms such as nitrogen, phosphorus, sulfur, chlorine, fluorine or metallic complex-forming agents may be incorporated.

According to the invention, at least part of the process gas is recirculated. For this purpose, process gas from the treatment chamber for thermal treatment of a bulk material, preferably a reactor, is fed to the catalytic combustion and is subsequently returned to the treatment chamber.

According to the invention, the process for purifying a process gas from a thermal treatment process of bulk materials comprises at least one step of catalytic combustion.

According to the invention, the process gas does not contain oxygen prior to purification or contains an amount of oxygen that is less than an amount of oxygen required for complete combustion of the organic impurities in the process gas. Thus, oxygen must be added to the process gas prior to catalytic combustion. The oxygen is supplied in the form of at least one oxygen- or ozone-containing gas, with air often being used.

The oxygen-containing gas is supplied to the process gas by means of a supply line, which may have fittings for controlling and measuring the amount of gas supplied.

According to the invention, the process gas is at least partially recirculated. In the case of oxygen-sensitive bulk materials in the thermal treatment process, the oxygen content in the purified process gas must therefore be kept low.

Oxygen could be removed from the process gas by so-called deoxers or by adsorption. However, this is complex and expensive in terms of equipment. It is more advantageous to control the oxygen supply to the contaminated process gas in such a way that the amount of oxygen added corresponds to or only slightly exceeds the amount of oxygen required for combustion.

Preferably, such an amount of oxygen-containing gas is added so that the average oxygen content measured after the catalyst is 0-500 ppm v/v, preferably 12-150 ppm v/v, or that the average carbon monoxide content measured after the catalyst is 0-200 ppm v/v, preferably 2-50 ppm v/v. The average values here refer to long-term values, for example calculated over several hours, preferably over 2 hours. Hydrogenation of the residual oxygen or binding of residual carbon monoxide and/or oxygen, for example by adsorption, is usually not necessary for such low residual amounts. Nevertheless, further oxygen reduction can be added for the treatment of bulk materials that are highly sensitive to oxygen.

The purification of the contaminated gas according to the invention is carried out by catalytic combustion. In catalytic combustion, the reaction of organic substances with oxygen in the presence of a catalytically active substance essentially results in $CO_2$ and water. In this process, the catalytically active substance reduces the activation energy of the oxidation reaction, allowing combustion to take place at a reduced temperature. Typically, catalytic combustion occurs in the presence of a solid catalyst. Noble metals or metal oxides, for example, are used as catalyst materials.

Preferred catalyst materials contain a proportion of platinum, palladium or rhodium as noble metals.

Preferred metal oxides comprise transition element metals, in particular from the fourth period of the periodic table of the elements (Sc, Ti, V, Cr, Mn, Fe, Co, Ni, Cu, Zn), wherein it has proved particularly advantageous if the catalyst material contains at least manganese oxide, iron oxide, copper oxide or cobalt oxide. Further details on the composition and application of such catalysts can be obtained from DE 10 2004 006 861 A1.

The catalyst material can be present as bulk material (solid material) or applied to a carrier material, suitable carrier materials being, for example, honeycomb structures or porous bulk material spheres. Preferably, aluminum oxide beads are used as the carrier material, which also have an oxygen-adsorbing layer.

The preferred bulk density of the catalyst bulk material used according to the invention (as solid material or on carrier material) is in a range of about 100 to 1500 $kg/dm^3$, in particular 200 to 900 $kg/dm^3$.

The preferred particle size of the bulk catalyst material used according to the invention is in a range of about 0.1 to 50 mm, in particular 1-10 mm.

The preferred specific surface area of the bulk catalyst used in accordance with the invention is in a range of about 50 to 500 $m^2/g$, in particular 60 to 300 $m^2/g$.

Preferably, the bulk catalyst material or the honeycomb structure is present as a so-called catalyst bed in a catalyst vessel and is flowed through by the process gas together with the amount of oxygen required for combustion from an inlet side to an outlet side of the catalyst bed. The cross-sectional area of the catalyst bed is selected in such a way that a linear velocity of the process gas or an empty tube velocity (operating volumetric flow rate/catalyst bed cross-section in the direction of the flow direction of the gas) in a range of about 0.3 to 5 m/s is obtained, resulting in a pressure loss of 5 mbar to 100 mbar, in particular 10 mbar to 50 mbar. The layer thickness of the catalyst bed should be constant over its entire cross section and be between 100 mm and 1000 mm, in particular between 200 mm and 500 mm. The space velocity (standard volumetric flow of the process gas divided by the catalyst volume) should be in the range from 1000 to 60000 $h^{-1}$, in particular from 3000 to 24000 $h^{-1}$, preferably from 4000 to 12000 h-1.

Combustion in the catalyst bed preferably takes place in a temperature range from 150° C. to 600° C., in particular from 170° C. to 450° C.

Combustion does not have to be 100%. However, since incomplete combustion can give rise to by-products such as CO or short-chain organic acids, the aim is to achieve the highest possible conversion rate of over 95%, preferably over 98% and in particular over 99%. The residual amount of organic impurities in the process gas after catalytic combustion should be between 0 and 50 $cm^3/m^3$, in particular between 0 and 20 $cm^3/m^3$.

The contaminated process gas may undergo further process steps prior to catalytic combustion, such as an increase in pressure, a process step to separate solid contaminants, for example by means of a cyclone separator and/or a filter, mixing with the supplied oxygen-containing gas, for example by means of a static mixer, and heating to raise the temperature to a suitable combustion temperature, for example by means of a heat exchanger for heat recovery and/or by means of a process gas heater.

If necessary, the catalyst bed can also be heated directly, for example by external heat sources or by the combustion heat of the impurities.

After catalytic combustion, the purified process gas can undergo further process steps, such as cooling, drying, pressure increase, a process step for separating solid impurities, for example by means of a cyclone separator and/or a filter, heating, and mixing with additives or other process gas streams.

Before entering the catalyst vessel, oxygen is added to the contaminated process gas.

To control the oxygen supply, at least one gas component is measured, via which the amount of oxygen required can be determined and adjusted. The oxygen supply can be achieved, for example, by a control command to a control valve in a supply line for compressed air to the process gas, the control command being calculated by a control unit on the basis of measured values of the gas component.

The gas component is preferably measured in a measuring chamber as described in CH-698 275 A2.

Essential for the operation of catalytic combustion are the controlled feed of the oxygen-containing gas into the process gas, the heating of the process gas to a suitable combustion temperature in a heat exchanger and the actual combustion in the catalyst bed. To optimize the process, heat from the process gas after catalytic combustion is also preferably recycled into the process gas upstream of the heat exchanger to heat up the process gas. This can preferably be done by means of a heat exchanger for energy recovery.

The process gas is heated, for example, in a heat exchanger, which can be designed, for example, as an electric heater with heating rods in direct contact with process gas or as plate or jacket-and-tube heat exchangers with indirect heat transfer from a heating medium to the process gas. Such heat exchangers are also referred to as process gas heaters.

In this case, combustion in the catalyst bed takes place in a catalyst vessel in which the catalyst bed is arranged in such a way that all process gas must flow through the catalyst bed on its way from entering the catalyst vessel to leaving the catalyst vessel.

The heat from the process gas is recovered, for example, in a heat exchanger, which can be designed, for example, as a plate or jacket-and-tube heat exchanger with indirect heat transfer from the process gas after catalytic combustion to the process gas upstream of the heat exchanger for heating the process gas. Such heat exchangers for energy recovery are also referred to as economizers.

According to a preferred embodiment of the present invention, the catalyst bed, the process gas heater and the economizer are enclosed by a common jacket. The preferred construction is such that the economizer is arranged in line with the process gas heater and the process gas heater is arranged in line with the catalyst bed. In particular, the economizer is arranged above the process gas heater, which in turn is arranged above the catalyst bed.

If the process gas heater is designed as an electric heater, the heating coil can be integrated directly into the inlet area of the catalyst vessel. If the process gas heater is designed as a jacket-and-tube heat exchanger, the process gas to be cleaned can flow through the tubes of the heat exchanger in line with the flow direction through the catalyst vessel.

If the economizer is designed as a jacket-and-tube heat exchanger, the process gas to be cleaned can flow through the tubes of the heat exchanger in line with the flow direction through the process gas heater.

One embodiment of the present invention provides that continuous tubes are used for the economizer and the process gas heater.

Preferably, the common jacket has the same diameter over the entire length of the connected process steps. If there are different diameters for individual process stages, there is a transition from one diameter to the next without intermediate necking down to an intermediate tube. The diameter ratio from the process stage with the largest diameter to the process stage with the smallest diameter should not exceed 2:1 and in particular 1.6:1. The gas flow in the common jacket has the advantage that the process gas to be cleaned is fed uniformly to the catalyst bed.

In the lower area of the catalyst vessel there is usually a gas outlet opening from which the process gas is led to a usually lateral inlet opening in the economizer. The return line required for this purpose can be designed as a pipeline or flow channel inside or outside the common jacket.

The catalyst material can be deposited in the central part of the catalyst vessel by a separator element, which allows gas but no catalyst material to pass through.

The separating element is usually a sieve arranged in the catalyst vessel in such a way that all process gas must flow through the sieve and the catalyst bed located on top of it.

The catalyst vessel is preferably constructed in such a way that the area containing the screen and catalyst bed can be separated from the process gas heater above it to allow catalyst material to be replaced.

Since there is only slight mixing of the process gas in a device with a common jacket and especially in jacket-and-tube heat exchangers, the oxygen-containing gas should be distributed as homogeneously as possible in the process gas, preferably before it enters the economizer. For this purpose, for example, a mixing element such as a static mixer or a distribution nozzle can be used. Alternatively, a mixing element can also be arranged in the common jacket described above.

Adsorption steps for the removal of so-called catalyst poisons are known in the prior art. Catalyst poisons are mostly inorganic substances that are deposited on the surface of the catalyst material and thus lead to a direct deactivation of the catalyst for catalytic combustion. Common catalyst poisons are halogens, sulfur and heavy metals. Adsorption of catalyst poisons can occur on the adsorbent material or on an adsorbent coating on a support material. Common adsorbent coatings are bases such as sodium hydroxide, potassium hydroxide, or even calcium oxide, as well as sodium or potassium carbonates.

Surprisingly, it was found that such adsorption materials are also suitable for the removal of high-boiling organic substances or organic substances with high combustion temperature. Such substances lead to deactivation of the catalyst for catalytic combustion if combustion is incomplete. High-boiling hydrocarbons in particular have a deactivating effect, as they can lead to carbon deposits on the catalyst material during incomplete combustion or directly clog the pores of the support material to which the catalyst material is applied.

According to a preferred embodiment of the present invention, prior to catalytic combustion, the contaminated gas passes through a step for adsorption of high boiling organic substances or organic substances with high combustion temperature on a solid adsorption material in a protective bed.

The protective bed can be designed as a surface coated with an adsorption material. Preferably, however, the protective bed consists of a solid material present as bulk material, which may consist entirely of an adsorption material or may be coated with an adsorption material. Preferably, the protective protective bed is present in an adsorption vessel. The process gas flows through the adsorption vessel from an inlet side to an outlet side, passing through the adsorption bed.

The protective bed material can be provided by a separator element, which allows gas but no protective bed material to pass, in the central part of the adsorption vessel.

The separating element is usually a sieve arranged in the adsorption vessel in such a way that all process gas must flow through the sieve and the protective bed located on it.

The protective bed can be selected in such a way that it chemically binds substances from the process gas, or that it physically accumulates substances from the process gas.

The inlet temperature of the process gas into the adsorption vessel can cover a wide range. However, it must be high enough to ensure any necessary chemical reactions and low enough to allow sufficient accumulation of substances to be physically bound.

In particular, the temperature is set in such a way that high-boiling substances condense and can be absorbed by the adsorption material. If the process gas contains water, the temperature is selected so that no condensation of water occurs in the protective bed. For the treatment of thermoplastic polycondensates, present as virgin material or as recyclate, the preferred temperature is in the range from 100 to 250° C., more preferably above 120° C. and particularly preferably below 170° C., especially preferably from 120° C. to 170° C.

To set the temperature, the process gas can be heated by means of heat exchangers or usually cooled. Cooling is preferably carried out in double-jacket tubes or jacket-and-tube heat exchangers to avoid deposits of condensing substances.

The contact time of the process gas in the protective bed ranges from a tenth of a second to several minutes. Contact times in the range of 2 to 20 seconds are preferred.

The cross-sectional area of the protective bed is selected in such a way that a linear velocity of the process gas or an empty pipe velocity (operating volumetric flow rate/protective bed fill cross-section in the direction of flow of the gas) results in a range of about 0.05 to 3 m/s, with a pressure loss of 10 mbar to 200 mbar, in particular 20 mbar to 100 mbar. The layer thickness of the protective bed should be constant over its entire cross-section and be in the ratio 10:1 to 1:10 to the diameter of the protective bed fill.

In particular, the adsorption material is selected such that high-boiling substances are removed from the process gas, with at least a reduction to below 20%, preferably to below 10%, of their initial value in the process gas.

Examples of adsorption materials that can be used according to the invention are zeolites, silica gels, activated carbon, activated alumina and aluminum dioxide.

The present invention thus further relates to an device for processing a mixture of recycled polyester material and a polyester prepolymer from a polyester manufacturing process, comprising a unit for producing the mixture of recycled polyester material and a polyester prepolymer from a polyester manufacturing process;
a reactor for thermal treatment of the mixture of recycled polyester material and a polyester prepolymer from a polyester manufacturing process with a process gas;
at least one catalyst bed arranged in a catalyst vessel having an inlet side and an outlet side for the process gas from the reactor for thermal treatment of the mixture,
preferably at least one connecting line connecting an outlet side of the reactor to an inlet side of the catalyst vessel, and a connecting line connecting an inlet side of the reactor to an outlet side of the catalyst vessel,
at least one heat exchanger for heating the process gas, which is arranged upstream of the inlet side into the catalyst vessel,
preferably at least one heat exchanger for energy recovery, which is connected upstream of the at least one heat exchanger for heating the process gas and at the same time downstream of the outlet side of the catalyst vessel;
characterized in that a protective bed with a solid adsorption material is arranged upstream of the heat exchanger for heating the process gas and thus upstream of the catalyst bed, which protective bed can remove from the process gas stream high-boiling organic substances or organic substances with a high combustion temperature at a temperature in the range of 100 to 250° C. by allowing the high-boiling substances to condense and be absorbed by the adsorption material.

According to the invention, conventional equipment for thermal treatment of a bulk material can be converted into a device according to the invention, in which one of the processes according to the invention can be carried out.

The present invention thus also relates to a process for retrofitting a plant for post-condensation of pelletized polyester virgin material to a plant for post-condensation of pelletized polyester consisting at least in part of pelletized polyester recyclate, wherein the post-condensation takes place in solid phase in a reactor, in which plant a process gas flows through the reactor and is at least partially recycled to the reactor, the process gas, before being recycled to the reactor, passing through a purification step in a catalytic combustion device, characterized in that the plant is enlarged by a unit for producing the mixture of recycled polyester material and a polyester prepolymer from a polyester production process, and is enlarged by the following process steps between the reactor and the catalytic combustion device:

a step for cooling the process gas
a step for adsorption of high boiling organic components in a protective bed.

BRIEF DESCRIPTION OF THE DRAWINGS

The present invention is explained in more detail below with reference to non-limiting examples and drawings. There is shown.

DETAILED DESCRIPTION OF THE PREFERRED EMBODIMENTS

Figure 1:
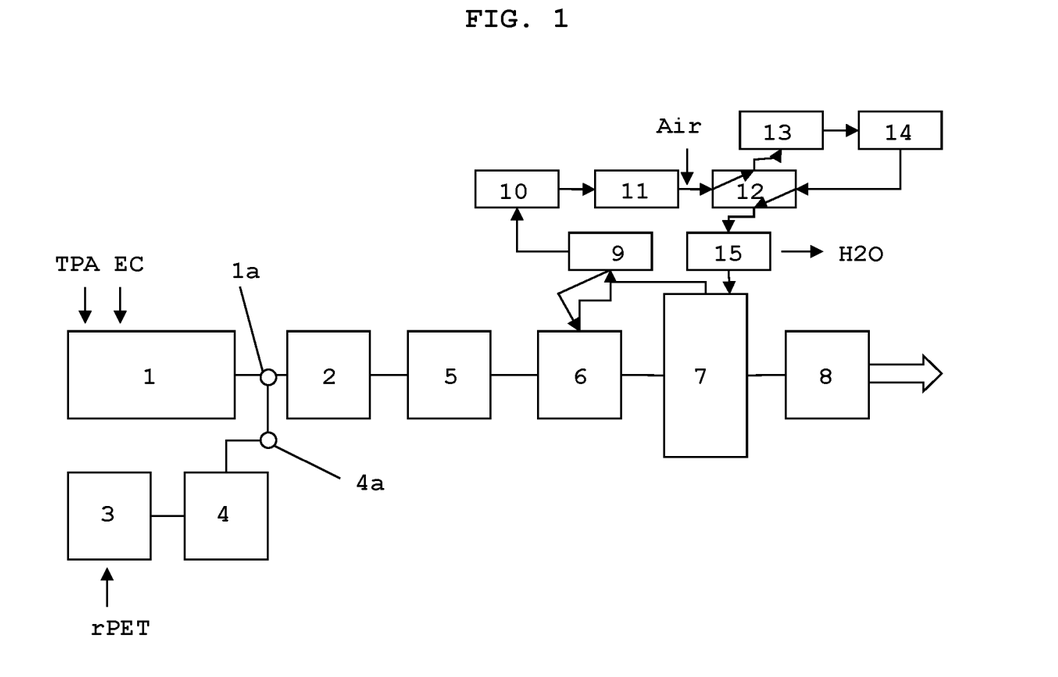
FIG. 1 is a schematic view of a device according to a first embodiment of the invention

FIG. 1 shows a schematic view of a device according to a first embodiment of the invention.

In a unit 1, a slurry is produced from terephthalic acid (TPA) and ethylene glycol (EG) and then subjected to esterification, prepolymerization and melt polycondensation in a finisher. A prepolymer melt of "virgin" PET leaves unit 1 and passes to a connecting unit 1a, in which a melt valve is preferably arranged.

PET recyclate (preferably PET flakes) are fed into an extruder 3 where they are melted and extruded. The melt of rPET is introduced into a melt filter 4 where it is purified from solid particles. The purified rPET melt is then fed via a connecting line to the connecting unit 1a, where it is combined with the prepolymer melt of virgin PET. A flush valve 4a can preferably be arranged in the connecting line for the rPET melt in order to prevent the introduction of contaminated or low-quality rPET melt and to divert such material out of the device. Furthermore, at least one unit for measuring a quality parameter may be arranged in the connection line for the rPET melt.

The melt mixture combined in the connecting unit 1a is then pelletized in a pelletizer 2 (preferably an underwater pelletizer or underwater strand pelletizer), dried if necessary and brought to a desired degree of crystallization in a crystallizer 5. The partially crystalline PET pellet mixture is heated in a preheater 6 to the temperature required for the SSP reaction and subjected to an SSP reaction in reactor 7. The finished PET mixture leaves reactor 7 with the desired intrinsic viscosity and can be further processed.

The process gas is led out of reactor 7 through an outlet and mixed together with the process gas from preheater 6 and passed through a filter 9 (to separate any PET dust possibly present). Subsequently, the process gas is fed into a pipeline 10 with a cooling jacket and cooled down there. The process gas then enters a protective bed 11. Air is then added to the process gas (to enable combustion of the organic substances in the process gas), and the process gas then passes through a heat exchanger for heat recovery (economizer) 12 and then through a process gas heater 13. The process gas enters a catalyst vessel 14, which contains a bulk catalyst with noble metal coating (platinum and palladium). There, the process gas is catalytically cleaned. For energy recovery, the purified gas is again passed through the economizer 12 and further cooled. The process gas is dried in a dryer 15 (for example a molecular sieve dryer).

After this, part of the process gas is fed back to reactor 7, while other parts of the process gas are fed to preheater 6 as exchange gas.

Figure 2:
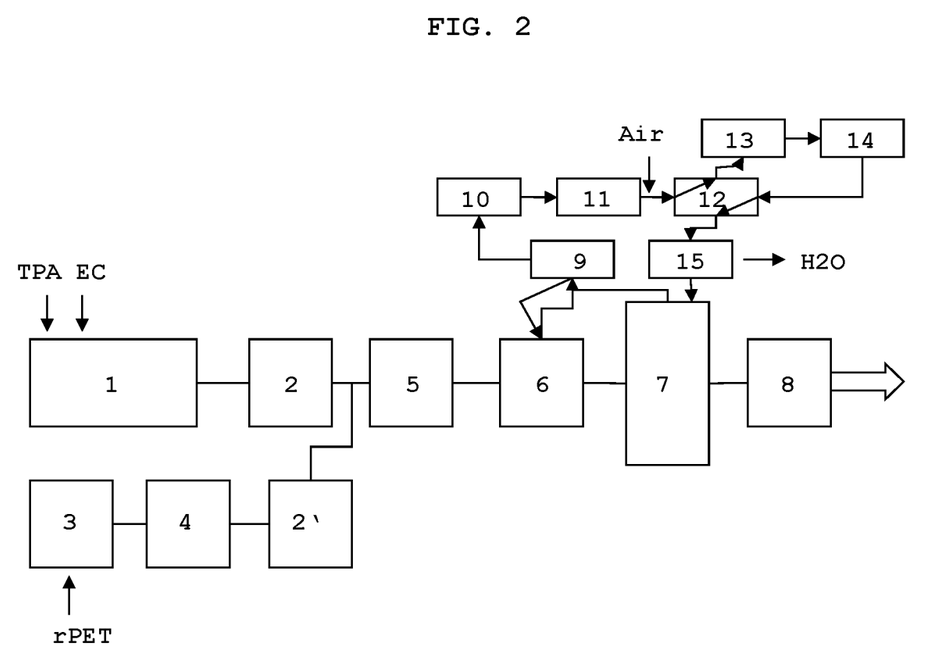
FIG. 2 is a schematic view of a device according to a second embodiment of the invention

FIG. 2 shows a schematic view of a device according to a second embodiment of the invention. The same reference signs indicate the same components.

The device according to FIG. 2 differs from the device according to FIG. 1 in that the rPET melt leaving the melt filter 4 enters a pelletizer 2' and is combined with the virgin PET pellets from the pelletizer 2. The remaining steps are identical.

Comparison Example 1

In a conventional plant for the production of a polyethylene terephthalate (PET), a slurry was prepared from terephthalic acid (TPA) with 2% isophthalic acid as comonomer and ethylene glycol (EG). This slurry was then subjected to the steps of esterification, prepolymerization, and melt phase polymerization in a finisher.

The obtained prepolymer melt was processed by underwater strand pelletization to cylindrical amorphous PET prepolymer pellets (pellet weight about 18 mg). The pellets were subjected to solid phase treatment comprising the steps of crystallization in a fluidized bed device, preheating to SSP reaction temperature under inert gas in a roof heat exchanger, solid phase polycondensation (SSP) under inert gas in a shaft reactor and cooling in a fluidized bed device.

The plant was operated at a throughput of 6.66 t/h. The intrinsic viscosity of the prepolyester before underwater strand granulation was 0.62 dl/g, and the acetaldehyde content was 66 ppm.

An inert gas flow of 65 m³/min was passed through the reactor to carry out the SSP reaction. The inert gas consisted mainly of nitrogen, with $CO_2$ and small amounts of water vapor, oxygen and volatile organic compounds from the PET manufacturing process (ethylene glycol and acetaldehyde) being present.

After a treatment time of 13 hours at around 204° C., the intrinsic viscosity of the PET was 0.82 dl/g.

The process gas from the reactor was led out of the reactor through an outlet, mixed with the process gas from the preheater, passed through a filter (to separate any PET dust possibly present) and then fed to a further cleaning stage using catalytic combustion. The process gas had a temperature of approx. 185° C. after the filter.

For purification, an amount of air sufficient to allow combustion of the organic substances in the process gas was added to the process gas. Subsequently, the process gas/air mixture was passed through a heat exchanger for heat recovery (economizer) and then through a process gas heater, where it was heated up to 380° C. The process gas was then purified in a catalyst bed. The actual combustion of the organic substances took place in a catalyst bed containing a bulk catalyst with noble metal coating (platinum and palladium). For energy recovery, the purified gas was passed back through the economizer and cooled further. Water produced due to combustion and already present in the gas was then removed in a molecular sieve dryer. Part of the process gas was then returned to the reactor, while other parts of the process gas were used as exchange gas for other process steps (conveying, crystallization, preheater).

The finished PET had an L value of 89.8, an a* value of −1.7 and a b* value of −2.5. The acetaldehyde content was reduced to 0.5 ppm.

Example 1

For Example 1, the plant from Comparative Example 1 was modified in such a way that three 5 m long pieces of pipe, each with an internal diameter of 0.3 m, and a cooling jacket were installed between the filter upstream of the gas purification device and the inlet to the economizer, as well as a protective bed with 9000 kg of an alumina bed in a 2.2 m diameter container. The alumina fill had a bulk weight of approximately 750 kg/m³ and included a basic coating capable of binding chlorine. The fill was supported in the tank on a screen grid and was approx. 3.2 m high. An additional fan was installed to overcome the pressure drop that occurred.

Comparison example 1 was repeated with the modified plant according to example 1. However, the plant capacity of the melt phase polymerization was reduced to 5.41 t/h. The PET prepolymer pellets were fed into a mixing silo. The PET prepolymer pellets were fed into a mixing silo and mixed with 1.25 t/h of PET recyclate pellets (rPET). The recyclate pellets were produced from post-consumer PET flakes (bottle flake) with a PVC (polyvinyl chloride) content in the range of 25 to 50 ppm in a single-screw extruder with melt pump, followed by melt filtration and underwater pelletization with subsequent direct crystallization. The mesh fineness for melt filtration was 40 μm. The viscosity of the PET recyclate pellets was 0.66 dl/g, their limonene content was 68 ppb, and their acetaldehyde content was 4 ppm. The pellet weight of the spherical pellets of the PET recyclate pellets was about 20 mg.

Subsequently, the mixture of PET prepolymer pellets and PET recyclate pellets was treated in the modified solid-phase treatment device.

The process gas from the SSP process was led out of the reactor for the SSP reaction through an outlet and cooled down to 150° C. in the pipeline with cooling jacket described above. A pressure drop of 55 mbar had occurred across the protective bed, which was compensated by operating a fan.

After solid phase treatment, a homogeneous mixture of PET polymer and approx. 19% PET recyclate was obtained despite the non-uniform pellet shape. The mixture had an IV value of 0.82 dl/g, an L value of 87.2, an a* value of −1.6 and a b* value of −1.9. The acetaldehyde content of the mixture was reduced to 0.5 ppm, and the limonene content to below 1 ppb.

Preforms and subsequently bottles were produced from the PET/rPET pellets according to example 1. The acetaldehyde content of the preform was 6.5 ppm. While the color of the rPET/PET preforms could still be distinguished from pure PET preforms, no difference could be detected in the bottle body.

The invention claimed is:

1. A method for processing a mixture of recycled polyester material and a polyester prepolymer from a polyester manufacturing process, comprising the following steps:
   blending said recycled polyester material with said polyester prepolymer from the polyester manufacturing process to produce a mixture of solids;
   treating this mixture of solids in a reactor for thermal treatment of bulk materials with a process gas in counter-current or cross-current to a flow direction of the mixture;
   introducing the process gas, containing organic impurities, into at least one heat exchanger to heat the process gas, and heating the process gas in said heat exchanger,
   controlling supply of an oxygen-containing gas to the process gas,
   introducing the process gas mixed with the oxygen-containing gas into a catalyst vessel with at least one catalyst bed arranged therein, through which the process gas flows from an inlet side to an outlet side of said catalyst vessel, combusting the organic impurities in the process gas in the at least one catalyst bed, at least partial recirculation of the process gas, wherein before entering the catalyst vessel, passing the process gas through a protective bed containing a solid adsorbent material, arranged upstream of the heat exchanger for heating the process gas, which removes high-boiling organic substances or organic substances having a high combustion temperature from the process gas stream, and setting a temperature in a range of 100 to 250° C. so that the high-boiling substances can condense and be absorbed by the adsorbent material.

2. The method according to claim 1, wherein said at least partial recirculation of the process gas is made into the reactor for thermal treatment of bulk material.

3. The method according to claim 1, wherein the polyester material is selected from the group consisting of polyethylene terephthalate and polyethylene terephthalate copolymers.

4. The method according to claim 1, wherein the recycled polyester material is pelletized and the pellets of recycled polyester material thus obtained are mixed with pellets of said polyester prepolymer from the polyester manufacturing process.

5. The method according to claim 1, wherein the recycled polyester material is provided as a melt, mixed with a melt of said polyester prepolymer from the polyester manufacturing process, and the melt mixture thus obtained is subsequently pelletized.

6. The method according to claim 2, wherein the recycled polyester material is provided as a melt, mixed with a melt of said polyester prepolymer from the polyester manufacturing process, and the melt mixture thus obtained is subsequently pelletized.

7. The method according to claim 2, wherein, before entering the protective bed, the process gas is cooled to a temperature in a range of 120-170° C.

8. A method for retrofitting a plant for thermal treatment of a bulk virgin material into a plant for thermal treatment of a pelletized polyester comprising at least partly recycled material, which comprises at least partly repelletized polyester recycled material, wherein the thermal treatment takes place in solid phase in a reactor through which a process gas flows, the process gas leaving the reactor being at least partially recirculated into the reactor and, before being recirculated into the reactor, passing through a purification step in a catalytic combustion device, wherein the plant is enlarged by a unit for producing a mixture of a recycled polyester material and a polyester prepolymer from a polyester production process, and between the reactor and the catalytic combustion device is enlarged by the following process steps:

a step for cooling the process gas a step for adsorption of high boiling organic components in a protective bed.

* * * * *